US011998783B1

(12) United States Patent
Brady

(10) Patent No.: US 11,998,783 B1
(45) Date of Patent: Jun. 4, 2024

(54) WILDFIRE CONE OF CONFIDENCE SIMULATION SYSTEM AND PROCESSES

(71) Applicant: Rachael Irene Brady, Igo, CA (US)

(72) Inventor: Rachael Irene Brady, Igo, CA (US)

( * ) Notice: Subject to any disclaimer, the term of this patent is extended or adjusted under 35 U.S.C. 154(b) by 0 days.

(21) Appl. No.: 18/376,104

(22) Filed: Oct. 3, 2023

Related U.S. Application Data

(60) Provisional application No. 63/413,053, filed on Oct. 4, 2022.

(51) Int. Cl.
*A62C 99/00* (2010.01)
*A62C 3/02* (2006.01)

(52) U.S. Cl.
CPC .......... *A62C 99/009* (2013.01); *A62C 3/0271* (2013.01)

(58) Field of Classification Search
CPC ........ A62C 3/02; A62C 3/0271; A62C 99/009
USPC ........................................................ 169/43, 45
See application file for complete search history.

(56) References Cited

U.S. PATENT DOCUMENTS

2016/0112854 A1* 4/2016 Goossen ................. H04W 4/02 455/404.2
2020/0155882 A1* 5/2020 Tohidi ...................... G06N 7/01
2022/0383102 A1* 12/2022 Le .......................... G06N 3/006
2023/0064973 A1* 3/2023 Ceballos Melo ...... G05D 1/104
2023/0338760 A1* 10/2023 Noori .................. A62C 3/0271
2023/0342526 A1* 10/2023 Farley ..................... G06F 30/27

* cited by examiner

*Primary Examiner* — Steven J Ganey
(74) *Attorney, Agent, or Firm* — Plager Schack LLP; Mark H. Plager; Stephen Hallberg

(57) ABSTRACT

A wildfire cone of confidence simulation system and processes is disclosed. Methodical application of the hurricane cone of confidence applied to wildfire simulations involves applying a methodology that has been utilized in the hurricane disaster space since the 1950s, to the current wildfire predictive modeling problem. As wildfires become larger and move more quickly the public requires notifications that are consumable and actionable.

8 Claims, 3 Drawing Sheets

WILDFIRE CONE OF CONFIDENCE SIMULATION SYSTEM AND PROCESSES

CLAIM OF BENEFIT TO PRIOR APPLICATION

This application claims benefit to U.S. Provisional Patent Application 63/413,053, entitled "wildfire cone of confidence simulation system and processes," filed Oct. 4, 2022. The U.S. Provisional Patent Application 63/413,053 is incorporated herein by reference.

BACKGROUND

Embodiments of the invention described in this specification relate generally to wildfire prediction systems, and more particularly, to a wildfire cone of confidence simulation system and wildfire cone of confidence simulation processes.

Wildfires occur all over and often destroy anything in their paths. As the risk of disaster from a wildfire cannot be overstated, most fire professionals and residents in common fire areas seeks as much information about new and ongoing wildfires as they can get. The existing options for obtaining such wildfire information are based on simulating wildfires. Specifically, there are numerous existing wildfire simulation modeling programs that are utilized by fire professionals in wildfire prediction. These wildfire simulation modeling programs include CAWFE, WRF-Fire, FlamMap, FARSITE, BehavePlus FOFEM, Fire Family Plus, NEXUS, WFDS, etc. These models provide granular modeling output. However, such granular modeling output often fails to provide full and comprehensive information sufficient for potential evacuees, the general public, and agencies charged with evacuations to make actionable decisions with respect to an ongoing wildfire.

On the other hand, in the hurricane disaster space, an existing methodology has been utilized in hurricane tracking and modeling since the 1950s. Specifically, a hurricane cone of confidence has been modeled in hurricane tracking simulations which attempt to project a hurricane's path, direction, and severity in advance of the potential disaster. The hurricane cone of confidence gives all interested parties (including agencies, potential evacuees, the general public, etc.) more information to make decisions in advance of potential disaster. Despite this added benefit in the hurricane disaster space, none of the existing options for predictive modeling of wildfires applies anything like a hurricane cone of confidence to their models. Although predictive modeling of hurricanes is based on entirely different natural force factors than predictive modeling of wildfires, a visually similar type of cone of confidence could conceivably be applied to wildfire modeling so as to provide all parties with more information from which to make actionable decisions.

Therefore, what is needed is a way to apply a cone of confidence type methodology to wildfire predictive modeling techniques to enhance the ability of all parties to make decisions in the face of a wildfire.

BRIEF DESCRIPTION

A wildfire cone of confidence simulation system and wildfire cone of confidence simulation processes are disclosed for applying a cone of confidence to a wildfire simulation. In some embodiments, the wildfire cone of confidence simulation processes comprise a high-level wildfire cone of confidence simulation process, a high-level emergency responder wildfire cone of confidence simulation process, and a continuously running wildfire cone of confidence simulation process for simulating a wildfire based on a wildfire propagation model and applying a cone of confidence to the wildfire simulation.

In some embodiments, the high-level wildfire cone of confidence simulation process comprises (i) running a wildfire simulation on a wildfire propagation model, (ii) identifying, via the wildfire simulation, a path and a direction the fire is likely to take, (iii) overlaying fire history onto output of the wildfire simulation, (iv) compiling a weighted overlay of the wildfire simulation and fire history, (v) applying a statistical probability of the path, direction, and timing of the wildfire based on outputs of the weighted overlay, (vi) identifying areas in which the overlays align within two standard deviations of a mean, (vii) creating a wildfire cone of confidence based the identified areas of alignment, and (viii) visually outputting the wildfire cone of confidence on a mapping interface with a plurality of time frame intervals.

In some embodiments, optional steps are added to the high-level wildfire cone of confidence simulation process which, when performed, execute as the high-level emergency responder wildfire cone of confidence simulation process. In addition to the steps of the high-level wildfire cone of confidence simulation process, the high-level emergency responder wildfire cone of confidence simulation process of some embodiments further comprises (ix) applying an evacuation buffer to the wildfire cone of confidence to aid emergency responders and (x) visually outputting the evacuation buffer applied to the wildfire cone of confidence on the mapping interface.

In some embodiments, the continuously running wildfire cone of confidence simulation process for simulating a wildfire based on a wildfire propagation model and applying a cone of confidence to the wildfire simulation comprises (i) running (at a start point) the wildfire simulation in connection with the wildfire propagation model, (ii) predicting and identifying, via the wildfire simulation, the path and the direction the wildfire is likely to take, (iii) retrieving fire history data of an area corresponding with the wildfire from a fire history repository, (iv) overlaying the fire history of the area onto output of the wildfire simulation, (v) compiling a weighted overlay of the wildfire simulation and the fire history, (vi) applying a statistical probability of the path, direction, and timing of the wildfire based on outputs of the weighted overlay, (vii) identifying areas in which the overlays align within two standard deviations of a mean, (viii) creating a wildfire cone of confidence based the identified areas of alignment, (ix) noting the probable timing of the wildfire in connection with the wildfire cone of confidence, (x) visually outputting the wildfire cone of confidence on a mapping interface with a plurality of highlighted time frame intervals that correspond to the probable timing noted in connection with the wildfire cone of confidence, (xi) evaluating the wildfire cone of confidence performance and rerunning the wildfire simulation as updated information arises, (xii) adding actual real-time updated fire progression data (any other data relevant to the fire progression) to the wildfire simulation, and (xiii) recompiling the weighted overlay of the wildfire simulation, the fire history, and the real-time updated fire progression data and proceeding through the remaining steps, as noted above.

In some embodiments, after visually outputting the wildfire cone of confidence on the mapping interface, the continuously running wildfire cone of confidence simulation process optionally enhances the wildfire cone of confidence displayed on the mapping interface as the wildfire simulation is running for emergency responders. The optional emergency responder steps of the continuously running wildfire cone of confidence simulation process comprise (xiv) applying an evacuation buffer to the wildfire cone of confidence to aid emergency responders and (xv) visually outputting the evacuation buffer applied to the wildfire cone of confidence on the mapping interface.

In some embodiments, after adding the actual fire progression data actual fire progression data (which itself is continuously updated in real-time) to the weighted overlay, the continuously running wildfire cone of confidence simulation process optionally reverts back to the start point by (xvi) rerunning the wildfire simulation with the actual fire progression data as additional input to start the wildfire simulation on the wildfire propagation model.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein.

DETAILED DESCRIPTION

Figure 1:
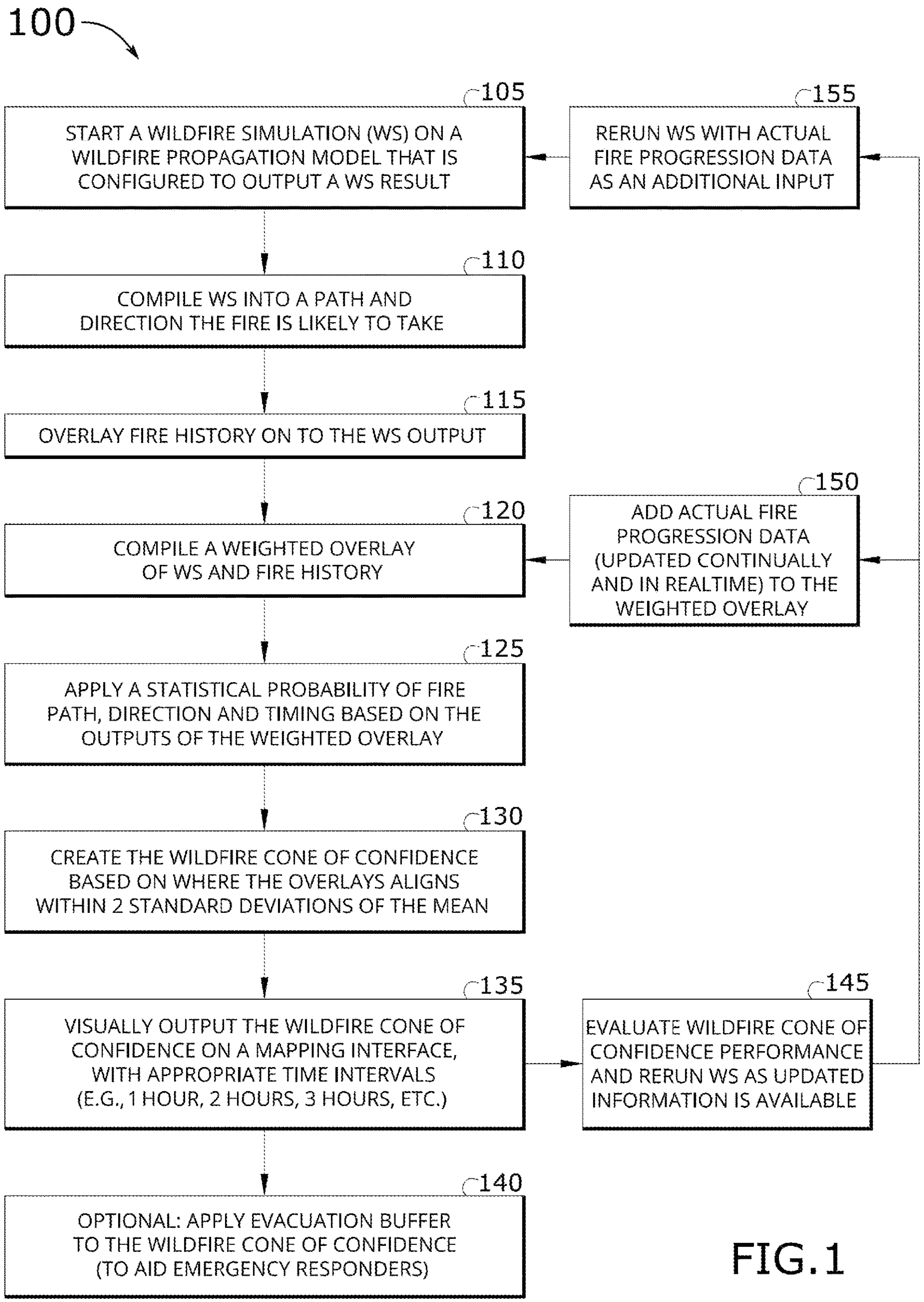
FIG. 1 conceptually illustrates a continuously running wildfire cone of confidence simulation process for simulating a wildfire based on a wildfire propagation model and applying a cone of confidence to the wildfire simulation in some embodiments.

In the following detailed description of the invention, numerous details, examples, and embodiments of the invention are described. However, it will be clear and apparent to one skilled in the art that the invention is not limited to the embodiments set forth and that the invention can be adapted for any of several applications.

Embodiments of the invention described in this specification include a novel wildfire cone of confidence simulation system and a plurality of wildfire cone of confidence simulation processes for applying a cone of confidence to a wildfire simulation generated by any of several wildfire simulation modeling programs, wildfire propagation models, and wildfire predictive modeling techniques.

In some embodiments, the wildfire cone of confidence simulation processes comprise a high-level wildfire cone of confidence simulation process, a high-level emergency responder wildfire cone of confidence simulation process, and a continuously running wildfire cone of confidence simulation process for simulating a wildfire based on a wildfire propagation model and applying a cone of confidence to the wildfire simulation.

In some embodiments, the high-level wildfire cone of confidence simulation process comprises (i) running a wildfire simulation on a wildfire propagation model, (ii) identifying, via the wildfire simulation, a path and a direction the fire is likely to take, (iii) overlaying fire history onto output of the wildfire simulation, (iv) compiling a weighted overlay of the wildfire simulation and fire history, (v) applying a statistical probability of the path, direction, and timing of the wildfire based on outputs of the weighted overlay, (vi) identifying areas in which the overlays align within two standard deviations of a mean, (vii) creating a wildfire cone of confidence based the identified areas of alignment, and (viii) visually outputting the wildfire cone of confidence on a mapping interface with a plurality of time frame intervals.

In some embodiments, optional steps are added to the high-level wildfire cone of confidence simulation process which, when performed, execute as the high-level emergency responder wildfire cone of confidence simulation process. In addition to the steps of the high-level wildfire cone of confidence simulation process, the high-level emergency responder wildfire cone of confidence simulation process of some embodiments further comprises (ix) applying an evacuation buffer to the wildfire cone of confidence to aid emergency responders and (x) visually outputting the evacuation buffer applied to the wildfire cone of confidence on the mapping interface.

In some embodiments, the continuously running wildfire cone of confidence simulation process for simulating a wildfire based on a wildfire propagation model and applying a cone of confidence to the wildfire simulation comprises (i) running (at a start point) the wildfire simulation in connection with the wildfire propagation model, (ii) predicting and identifying, via the wildfire simulation, the path and the direction the wildfire is likely to take, (iii) retrieving fire history data of an area corresponding with the wildfire from a fire history repository, (iv) overlaying the fire history of the area onto output of the wildfire simulation, (v) compiling a weighted overlay of the wildfire simulation and the fire history, (vi) applying a statistical probability of the path, direction, and timing of the wildfire based on outputs of the weighted overlay, (vii) identifying areas in which the overlays align within two standard deviations of a mean, (viii) creating a wildfire cone of confidence based the identified areas of alignment, (ix) noting the probable timing of the wildfire in connection with the wildfire cone of confidence, (x) visually outputting the wildfire cone of confidence on a mapping interface with a plurality of highlighted time frame intervals that correspond to the probable timing noted in connection with the wildfire cone of confidence, (xi) evaluating the wildfire cone of confidence performance and rerunning the wildfire simulation as updated information arises, (xii) adding actual real-time updated fire progression data (any other data relevant to the progression of the wildfire) to the wildfire simulation as the information arises, and (xiii) recompiling the weighted overlay of the wildfire simulation, the fire history, and the real-time updated fire progression data and proceeding through the remaining steps, as noted above.

In some embodiments, after visually outputting the wildfire cone of confidence on the mapping interface, the continuously running wildfire cone of confidence simulation process optionally enhances the wildfire cone of confidence displayed on the mapping interface as the wildfire simulation is running for emergency responders. The optional emergency responder steps of the continuously running wildfire cone of confidence simulation process comprise (xiv) applying an evacuation buffer to the wildfire cone of confidence to aid emergency responders and (xv) visually outputting the evacuation buffer applied to the wildfire cone of confidence on the mapping interface.

In some embodiments, after adding the actual fire progression data actual fire progression data (which itself is continuously updated in real-time) to the weighted overlay, the continuously running wildfire cone of confidence simulation process optionally reverts back to the start point by (xvi) rerunning the wildfire simulation with the actual fire progression data as additional input to start the wildfire simulation on the wildfire propagation model.

As stated above, wildfires occur all over and often destroy anything in their paths. As the risk of disaster from a wildfire cannot be overstated, most fire professionals and residents in common fire areas seeks as much information about new and ongoing wildfires as they can get. The existing options for obtaining such wildfire information are based on simulating wildfires, of which there are numerous existing wildfire simulation modeling programs that are utilized by fire professionals in wildfire prediction, and the models for these programs provide granular modeling output. However, such granular modeling output often fails to provide full and comprehensive information sufficient for potential evacuees, the general public, and agencies charged with evacuations to make actionable decisions with respect to an ongoing wildfire. On the other hand, in the hurricane disaster space, an existing methodology has been utilized in hurricane tracking and modeling since the 1950s. Specifically, a hurricane cone of confidence has been modeled in hurricane tracking simulations which attempt to project a hurricane's path, direction, and severity in advance of the potential disaster. The hurricane cone of confidence gives all interested parties (including agencies, potential evacuees, the general public, etc.) more information to make decisions in advance of potential disaster. Despite this added benefit in the hurricane disaster space, none of the existing options for predictive modeling of wildfires applies anything like a hurricane cone of confidence to their models. Although predictive modeling of hurricanes is based on entirely different natural force factors than predictive modeling of wildfires, a visually similar type of cone of confidence could conceivably be applied to wildfire modeling so as to provide all parties with more information from which to make actionable decisions. Embodiments of the wildfire cone of confidence simulation system and processes described in this specification solve such problems by combining the methodology of fire modeling with the hurricane cone of confidence prediction to provide a general direction and speed of a wildfire. This will allow the public to easily consume wildfire prediction models in a relatable manner to existing public messaging.

Embodiments of the wildfire cone of confidence simulation system and processes described in this specification differ from and improve upon currently existing options. In particular, existing fire models provide prediction outputs, which typically show a granular model that does provide practical translation into public notifications. By contrast, the wildfire cone of confidence simulation system and processes of the present disclosure take the methodology applied by hurricane prediction communications and repurposes it into the wildfire space, making notifications more meaningful and actionable to the public and non-wildfire professionals. To repurpose this for wildfire disasters and prediction modeling, several underlying aspects differ from a hurricane cone of confidence, resulting in different ways of processing, overlaying, and displaying relevant wildfire information.

In addition to the notable differences with existing system noted above, other existing methods are designed for wildfire professionals and suppression tactics, not for public consumption of information. The consequence of this is that most people will find it harder to make actionable decisions in the face of a nearby wildfire. The wildfire cone of confidence simulation system and processes described in this specification solve this issue by applying a long-established methodology in a new way and applies it in a different area, namely, wildfire predictive modeling. Also, the wildfire cone of confidence simulation system and processes can be configured to provide evacuation notices to the public, which aids the public as well as emergency responders. In this way, the wildfire cone of confidence simulation system and processes provide effective ways to communicate potential evacuation areas to the public.

The wildfire cone of confidence simulation system and processes of the present disclosure may be comprised of the following elements and steps. This list of possible constituent elements and steps is intended to be exemplary only and it is not intended that this list be used to limit the wildfire cone of confidence simulation system to just these elements or any of the wildfire cone of confidence simulation processes of the present application to just these steps. Persons having ordinary skill in the art relevant to the present disclosure may understand there to be equivalent elements and/or steps that may be substituted within the present disclosure without changing the essential function or operation of the wildfire cone of confidence simulation system or the wildfire cone of confidence simulation processes.

1. One or multiple wildfire simulation models are running.
2. The results of wildfire simulations models are compiled into the path and direction the fire is likely to take.
3. Fire history is overlayed with the simulations.
4. A weighted overlay is compiled of the wildfire simulation models and the fire history.
5. A wildfire cone of confidence is applied the weighted overlay.
6. Anywhere where the simulations align within two standard deviations of the mean will be shown within the wildfire cone of confidence.
7. The cone of confidence will then be displayed on a mapping interface, with appropriate intervals (e.g., 1 hour, 2 hours, 3 hours, 6 hours, etc.).
8. An evacuation buffer can be applied to the cone of confidence to aid emergency responders.

An example of the cone of confidence that is displayed on a mapping interfacing with appropriate time intervals to show fire progression is described below, by reference to FIG. 2. However, the exemplary cone of confidence shown in FIG. 2 does not demonstrate application of an evacuation buffer to the cone of confidence, which is intended as an optional feature to aid emergency responders in decision making and provide the public with early warnings.

The wildfire cone of confidence simulation processes of the present disclosure generally work as software running on a computing device. By running on a processing unit of the computing device, the software (or "wildfire cone of confidence simulation program(s)"), the step-by-step operations are carried out to generate and display a wildfire cone of confidence on a mapping interface in connection with a running wildfire simulation model, and one which can be created that provides actionable communication to non-wildfire emergency responders and the general public.

To make the wildfire cone of confidence simulation system and processes of the present disclosure, one may design, develop, and implement the software for the steps identified previously using a geographic information system, multiple outputs can be created to provide a visual representation of the wildfire cone of confidence for public and agency consumption. The processes can be streamlined over time through automated code development to create an accessible API that can be accessed for every dispatched fire in the United States and the world.

The more wildfire simulation models that are run, the more confidence users can have in the prediction inherent in the wildfire cone of confidence. Huge advancements in the future are possible in wildfire simulations, generally, which would then tend to require less running of the models. Nevertheless, fire history is not in any way required to run a wildfire simulation model and generate a wildfire cone of confidence, although in can improve the prediction when available. The evacuation buffer is optionally available when that output is desired. However, it will likely not needed for small, slow-moving wildfires.

To use the wildfire cone of confidence simulation system and processes of the present disclosure, one may apply the wildfire cone of confidence to wildfire simulations, so that relevant information can be distributed. For example, non-wildfire emergency responders can quickly assess the situation and confidently communicate with the public.

By way of example, FIG. 1 conceptually illustrates a continuously running wildfire cone of confidence simulation process 100 for simulating a wildfire in based on a wildfire propagation model and applying a cone of confidence to the wildfire simulation. The continuously running wildfire cone of confidence simulation process 100 shown in this figure begins when a wildfire simulation is started on a wildfire propagation model (at 105). Specifically, the wildfire simulation is configured to output a wildfire simulation result.

After starting the wildfire simulation, the continuously running wildfire cone of confidence simulation process 100 compiles the wildfire simulation into a path and direction the fire is likely to take (at 110). In some embodiments, the path and direction are determined based on several factors including, without limitation, current and forecast weather conditions (wind, sunny/cloudy, precipitation, air pressure, etc.), terrain typography, vegetation nearby and at the site of the wildfire, etc.

Next, the continuously running wildfire cone of confidence simulation process 100 overlays fire history onto the wildfire simulation output (at 115). In some embodiments, the wildfire cone of confidence simulation system provides access to one or more data repositories that store historical fire data (or "fire history data") that can be retrieved by querying for the fire history based on a location of the wildfire. Thus, after retrieving the fire history data, the continuously running wildfire cone of confidence simulation process 100 of some embodiments interprets the fire history data and overlays the fire history onto the wildfire simulation output.

After overlaying the first history, the continuously running wildfire cone of confidence simulation process 100 compiles a weighted overlay of the wildfire simulation and fire history (at 120). Next, the continuously running wildfire cone of confidence simulation process 100 applies a statistical probability of the path of the wildfire, the direction of the wildfire, and the timing of the wildfire (along several time intervals) based on the outputs of the weighted overlay (at 125).

In some embodiments, the continuously running wildfire cone of confidence simulation process 100 proceeds to the next step for creating a wildfire cone of confidence (at 130) based on where the overlays align within two standard deviations of the mean. After creating the wildfire cone of confidence (at 130), the continuously running wildfire cone of confidence simulation process 100 visually outputs the wildfire cone of confidence on a mapping interface (at 135). In some embodiments, the continuously running wildfire cone of confidence simulation process 100 visually outputs the wildfire cone of confidence on the mapping interface (at 135) with appropriate time intervals marked or indicated. For example, displaying a one hour time interval (that is, one hour later) that demarcates the possible wildfire progression area in the wildfire cone of confidence, and similar time intervals for two hours (later), three hours, etc.

In some embodiments, an evacuation buffer is needed to aide emergency responders. When the evacuation buffer is needed, the continuously running wildfire cone of confidence simulation process 100 of some embodiments identifies an evacuation buffer in terms of the projected cone of the wildfire and applies the evacuation buffer to the wildfire cone of confidence (at 140) to inform emergency responders (who may then inform or direct the public). In some embodiments, the continuously running wildfire cone of confidence simulation process 100 also performs a linked step for visually outputting the evacuation buffer applied to the wildfire cone of confidence on the mapping interface (at 140).

After visually outputting the wildfire cone of confidence on the mapping interface (at 135) with appropriate time intervals displayed, whether or not an evacuation buffer was needed by emergency responders or not, the continuously running wildfire cone of confidence simulation process 100 of some embodiments proceeds to a step for evaluating performance of the wildfire cone of confidence (at 145) and, when updated information arises and is obtained, rerunning the wildfire simulation with the updated information. In some embodiments, the wildfire cone of confidence simulation system retrieves updated information in real-time. The updated information includes, without limitation, actual progress of the fire in comparison to the wildfire simulation, changes to weather, changes in direction and/or path, or other changes.

Next, the continuously running wildfire cone of confidence simulation process 100 of some embodiments proceeds to a step for adding actual fire progression data, and any other data pertaining to the continually updated in real-time information, to the weighted overlay (at 150). Then the continuously running wildfire cone of confidence simulation process 100 transitions back to the step for compiling the weighted overlay of the wildfire simulation and fire history (at 120). In this case, the step for compiling is actually a step for re-compiling, since this process 100 is a continuously running and the weighted overlay was already compiled (at 120) in a first run-through after initially starting the wildfire simulation (at 105). Then the continuously running wildfire cone of confidence simulation process 100 proceeds through the subsequent steps (at 125-145 and, optionally, at 140) following the re-compiling of the weighted overlay (at 120).

In some embodiments, instead of re-compiling the weighted overlay (at 120), or contemporaneously and in conjunction with re-compiling the weighted overlay (at 120), the continuously running wildfire cone of confidence simulation process 100 performs a step for re-running the wildfire simulation (at 155). Specifically, the continuously running wildfire cone of confidence simulation process 100 reruns the wildfire simulation (at 155) with the actual fire progression and other relevant data as an additional input to the wildfire propagation model on which the wildfire simulation is run. As this is a continuously running wildfire cone of confidence simulation process 100, there is no execution stopping point other than those induced from outside forces, such as killing the process/threads running on the computing device for the software or turning off power, etc.

Figure 2:
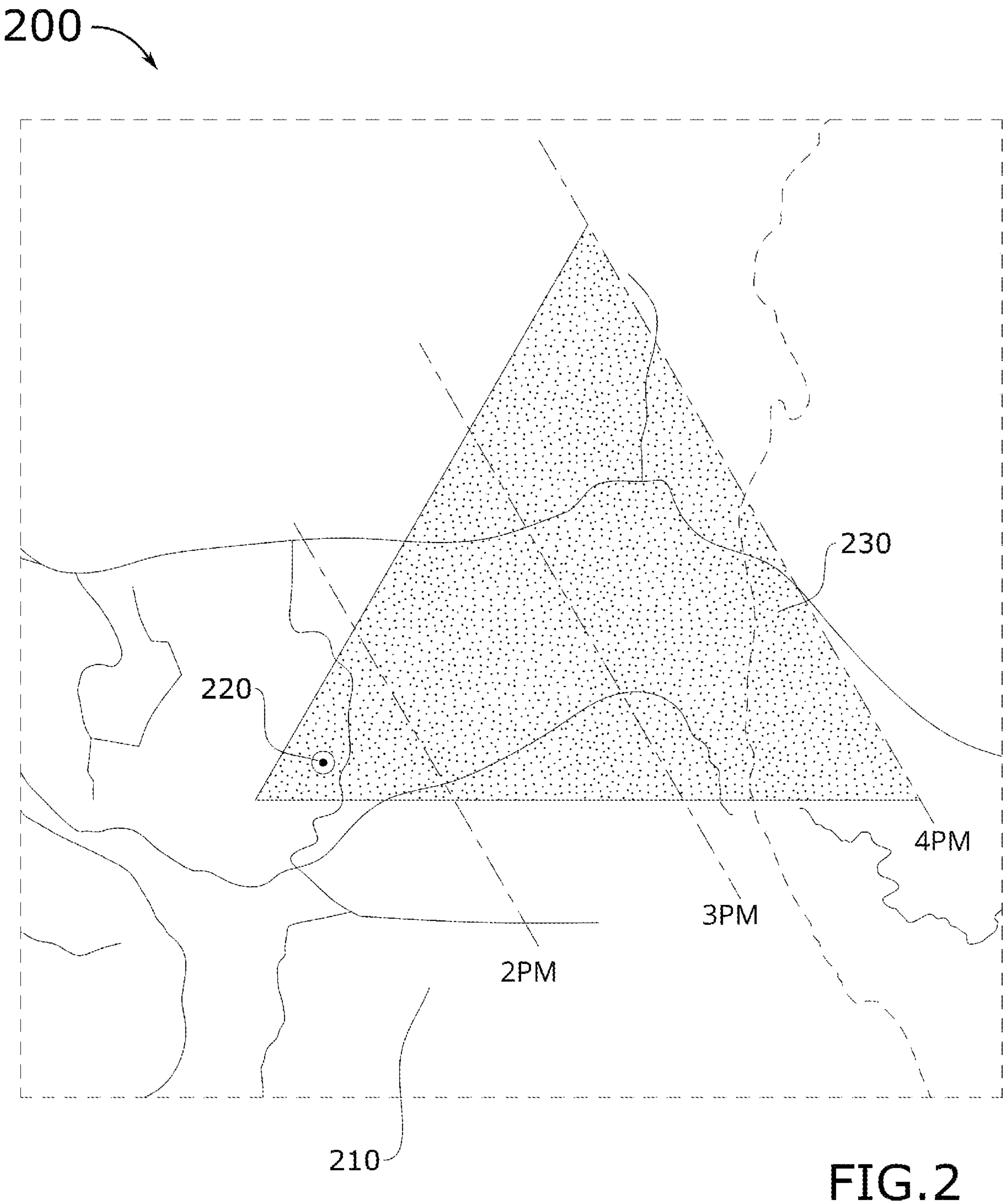
FIG. 2 conceptually illustrates an exemplary wildfire cone of confidence applied to a wildfire simulation in some embodiments.

By way of example, FIG. 2 conceptually illustrates an exemplary wildfire cone of confidence applied to a wildfire simulation 200. As shown in this figure, the wildfire simulation 200 is visually output in a mapping interface 210 and indicates a current wildfire location 220. From the point of the wildfire location 220, a wildfire cone of confidence 230 is visually output onto the mapping interface 210. As shown, the wildfire cone of confidence 230 resembles a triangular shape and is bifurcated along dashed marker lines indicated time intervals of predicted fire expansion or movement (given a current estimated path and direction, and other factors including fire history data, weather data, etc.). In this way, all parties (e.g., the public, fire personnel, emergency responders, etc.) in the areas covered by the wildfire cone of confidence 230 can use this information to make actionable decisions about evacuating their homes, workplaces, or other areas in the area covered by the wildfire cone of confidence 230.

Many of the above-described features and applications are implemented as software processes that are specified as a set of instructions recorded on a computer readable storage medium (also referred to as computer readable medium or machine readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 3:
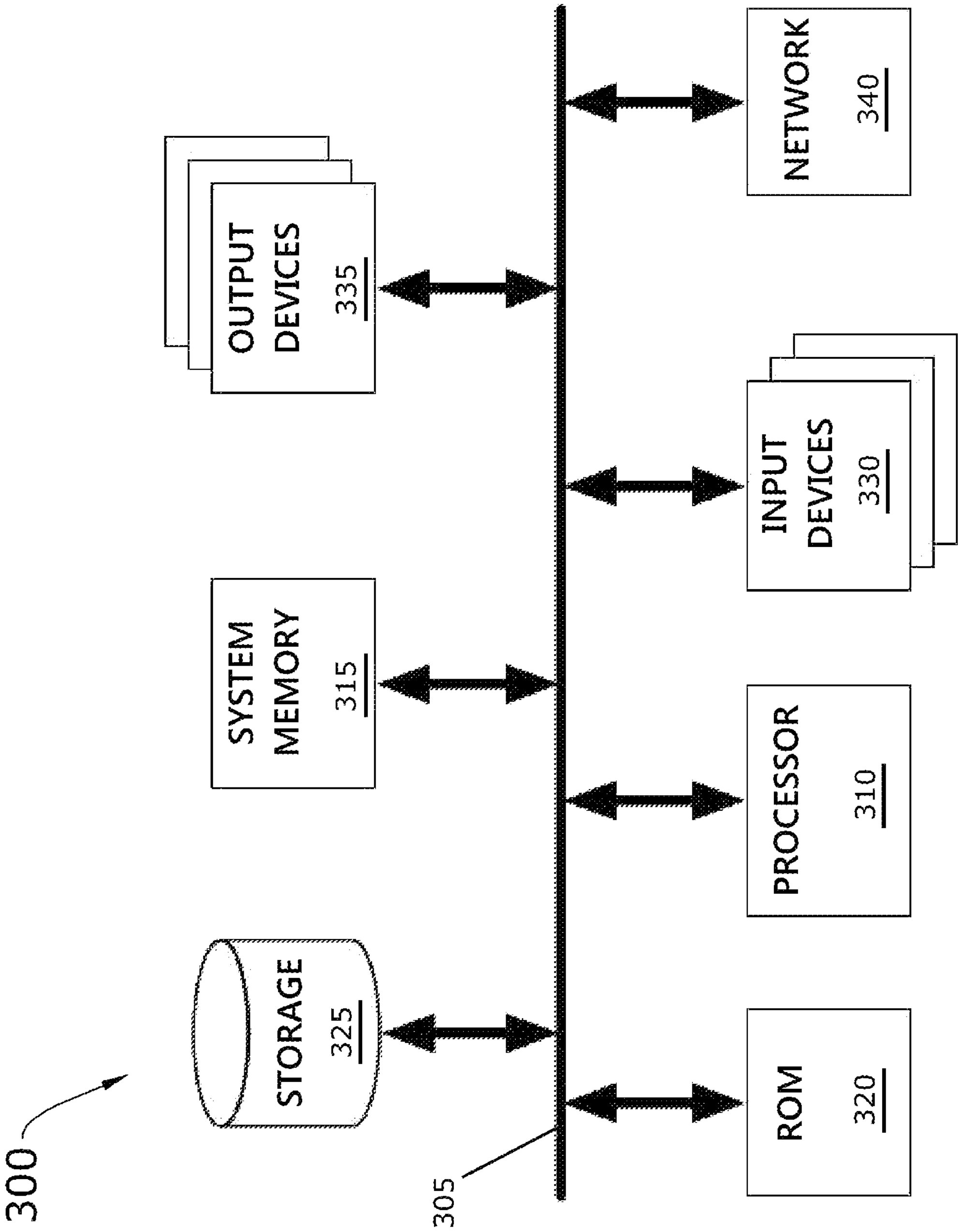
FIG. 3 conceptually illustrates an electronic system with which some embodiments of the invention are implemented.

FIG. 3 conceptually illustrates an electronic system 300 with which some embodiments of the invention are implemented. The electronic system 300 may be a computer, such as a desktop computer, a laptop computer, a server, a single board computer (SBC), a mobile computing device, or any other sort of electronic device or computing device capable of running a wildfire simulation and visually output graphical overlays of the wildfire simulation, a wildfire cone of confidence, and other visual graphics in a mapping interface, mapping program, or cloud-based mapping application service. Such an electronic system includes various types of computer readable media and interfaces for various other types of computer readable media. Electronic system 300 includes a bus 305, processing unit(s) 310, a system memory 315, a read-only memory 320, a permanent storage device 325, input devices 330, output devices 335, and a network 340.

The bus 305 collectively represents all system, peripheral, and chipset buses that communicatively connect the numerous internal devices of the electronic system 300. For instance, the bus 305 communicatively connects the processing unit(s) 310 with the read-only memory 320, the system memory 315, and the permanent storage device 325.

From these various memory units, the processing unit(s) 310 retrieves instructions to execute and data to process in order to execute the processes of the invention. The processing unit(s) may be a single processor or a multi-core processor in different embodiments.

The read-only-memory (ROM) 320 stores static data and instructions that are needed by the processing unit(s) 310 and other modules of the electronic system. The permanent storage device 325, on the other hand, is a read-and-write memory device. This device is a non-volatile memory unit that stores instructions and data even when the electronic system 300 is off. Some embodiments of the invention use a mass-storage device (such as a magnetic or optical disk and its corresponding disk drive) as the permanent storage device 325.

Other embodiments use a removable storage device (such as a floppy disk or a flash drive) as the permanent storage device 325. Like the permanent storage device 325, the system memory 315 is a read-and-write memory device. However, unlike storage device 325, the system memory 315 is a volatile read-and-write memory, such as a random access memory. The system memory 315 stores some of the instructions and data that the processor needs at runtime. In some embodiments, the invention's processes are stored in the system memory 315, the permanent storage device 325, and/or the read-only 320. For example, the various memory units include instructions for processing actual wildfire data, historic fire data, and other data relevant to fire progression, and visually outputting a wildfire cone of confidence in connection with a wildfire simulation being modeled in accordance the embodiments described above. From these various memory units, the processing unit(s) 310 retrieves instructions to execute and data to process in order to execute the processes of some embodiments.

The bus 305 also connects to the input and output devices 330 and 335. The input devices enable the user to communicate information and select commands to the electronic system. The input devices 330 include alphanumeric keyboards and pointing devices (also called "cursor control devices"). The output devices 335 display images, simulation graphics, video, alphanumeric data, and other information generated by the electronic system 300. The output devices 335 include display devices, such as liquid crystal displays (LCD) and organic light emitting diode (OLED) displays. The output devices 335 may also include other conventional computer output devices, such as printers. Some embodiments include devices such as a touchscreen that functions as both input and output devices.

Finally, as shown in FIG. 3, bus 305 also couples electronic system 300 to a network 340 through a network adapter (not shown). In this manner, the computer can be a part of a network of computers (such as a local area network ("LAN"), a wide area network ("WAN"), or an intranet), or a network of networks (such as the Internet). Any or all components of electronic system 300 may be used in conjunction with the invention.

These functions described above can be implemented in digital electronic circuitry, in computer software, firmware or hardware. The techniques can be implemented using one or more computer program products. Programmable processors and computers can be packaged or included in mobile devices. The processes may be performed by one or more programmable processors and by one or more set of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the invention has been described with reference to numerous specific details, one of ordinary skill in the art will recognize that the invention can be embodied in other specific forms without departing from the spirit of the invention. For instance, FIG. 1 conceptually illustrates the continuously running wildfire cone of confidence simulation process for simulating a wildfire based on a wildfire propagation model and applying a cone of confidence to the wildfire simulation. Notably, the specific operations of the continuously running wildfire cone of confidence simulation process may not be performed in the exact order shown and described. For instance, instead of executing all of the operations of the continuously running wildfire cone of confidence simulation process, some situations may necessitate a more limited set of operations, such as those for the high-level wildfire cone of confidence simulation process. Specific operations may not be performed in one continuous series of operations, and different specific operations may be performed in different embodiments. Furthermore, the continuously running wildfire cone of confidence simulation process could be implemented using several sub-processes, or as part of a larger macro process. Similarly, the wildfire cone of confidence simulation system and processes described above could be adapted to provide evacuation notices to the public. Alternatively, the wildfire cone of confidence simulation system and processes could be adapted to provide a new way to communicate potential evacuation areas to the public. Thus, one of ordinary skill in the art would understand that the invention is not to be limited by the foregoing illustrative details, but rather is to be defined by the appended claims.

I claim:

1. A wildfire cone of confidence simulation process comprising:

running a particular wildfire simulation ("WS") for a fire on one wildfire propagation model of multiple wildfire simulation models, wherein the wildfire propagation model is configured to output a WS result ("WS result output") after running the particular WS;

compiling the particular WS into a path and a direction the fire is likely to take based on the WS result output;

overlaying fire history information onto the WS result output;

compiling a weighted overlay of the particular WS and the fire history;

applying a statistical probability of fire path, direction, and timing based on outputs of the weighted overlay;

creating a wildfire cone of confidence;

identifying areas in which the weighted overlay of the particular WS and the fire history aligns within two standard deviations of a mean;

adding the identified areas in the wildfire cone of confidence;

displaying the wildfire cone of confidence on a mapping interface with a plurality of highlighted time frame intervals; and applying an evacuation buffer to the wildfire cone of confidence to aid emergency responders.

2. The wildfire cone of confidence simulation process of claim 1, wherein the plurality of highlighted time frame intervals comprises a one hour time frame interval.

3. The wildfire cone of confidence simulation process of claim 1, wherein the plurality of highlighted time frame intervals comprises a two hour time frame interval.

4. The wildfire cone of confidence simulation process of claim 1, wherein the plurality of highlighted time frame intervals comprises a three hour time frame interval.

5. The wildfire cone of confidence simulation process of claim 1 further comprising adding actual fire progression data to the weighted overlay of the particular WS.

6. The wildfire cone of confidence simulation process of claim 5, wherein adding actual fire progression data comprises continually adding actual fire progression data to the weighted overlay in realtime.

7. The wildfire cone of confidence simulation process of claim 5 further comprising recompiling the weighted overlay of the particular WS and the fire history after the actual fire progression data is added to the weighted overlay.

8. The wildfire cone of confidence simulation process of claim 1 further comprising rerunning the particular WS with actual fire progression data as an additional input.

* * * * *